May 14, 1968 W. E. W. JACOB 3,383,472

COORDINATE SWITCH AND TELECOMMUNICATION SYSTEM COMPRISING BILATERAL SEMICONDUCTOR SWITCH MEANS

Filed July 8, 1965 2 Sheets-Sheet 1

INVENTOR.
WALTER EMIL WILHELM JACOB
BY Hane and Nydick
ATTORNEYS

INVENTOR.
WALTER EMIL WILHELM JACOB
BY Hane and Nydick
ATTORNEYS

United States Patent Office 3,383,472

Patented May 14, 1968

3,383,472

COORDINATE SWITCH AND TELECOMMUNICATION SYSTEM COMPRISING BILATERAL SEMI-CONDUCTOR SWITCH MEANS

Walter Emil Wilhelm Jacob, Stuvsta, Sweden, assignor to Telefonaktiebolaget L. M. Ericsson, Stockholm, Sweden, a corporation of Sweden Filed July 8, 1965, Ser. No. 470,388

Claims priority, application Sweden, July 24, 1964, 9,003/64

5 Claims. (Cl. 179—18)

The present invention refers to a coordinate switch for connecting an arbitrary conductor of a first group of conductors to an arbitrary conductor of a second group of conductors.

The coordinate switch according to the invention is principally characterized by each conductor of the first group being joined to each conductor of the other group through a specific connection element. Such an element comprises a body of semi-conducting material provided with connection electrodes. The connection element can be transformed from a non-conducting condition to conducting condition by applying a voltage exceeding a threshold value and reducing the resultant current through the element in a slowly decreasing time sequence, and from the conducting condition can be transformed to non-conducting condition by means of a current passing through the element and having a rapidly decreasing time sequence. By using such an element an electric connection is controllably established between two arbitrary conductors in the respective groups.

Figures 1A, 1B:
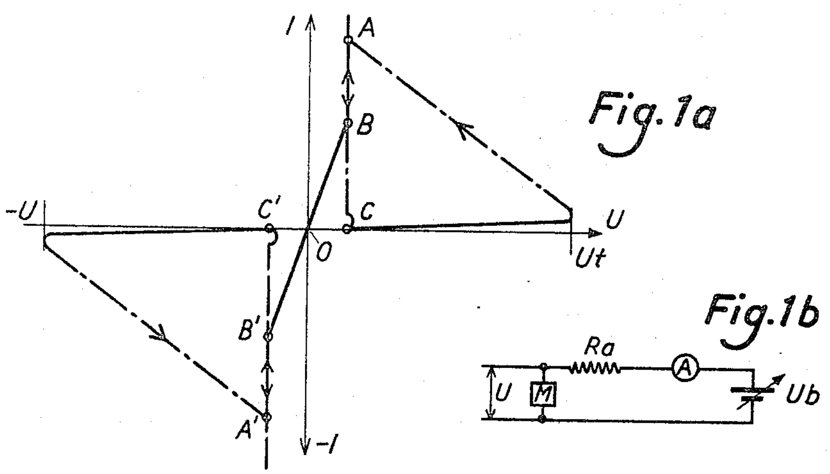
Figure 4:
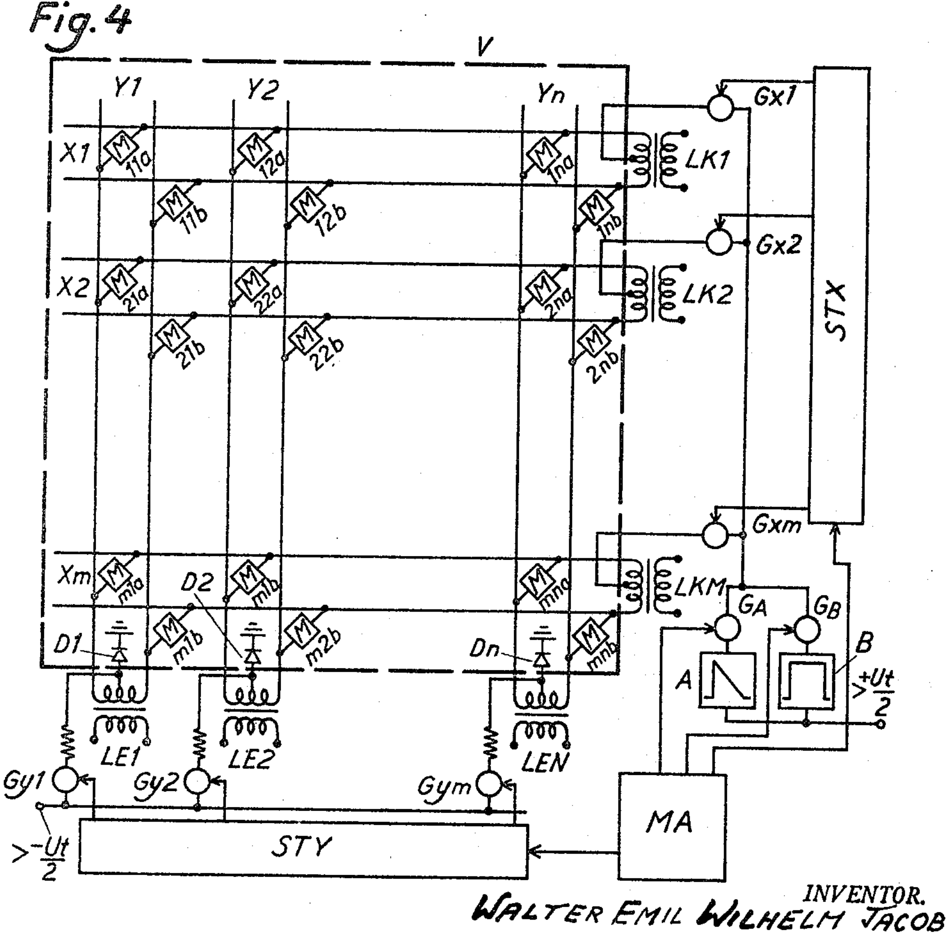
Figure 2:
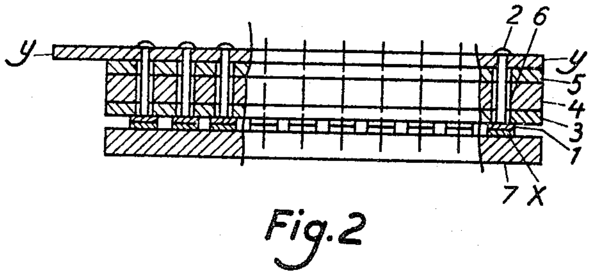
Figure 3:
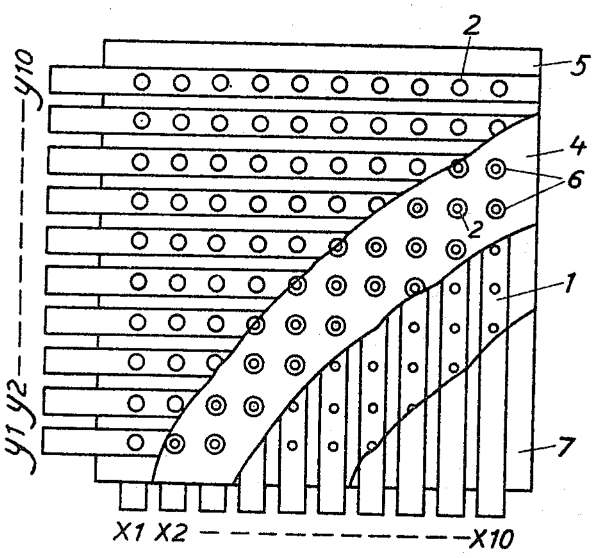

The invention will be further explained by means of an embodiment with reference to the attached drawing in which FIG. 1*a* shows a voltage current diagram for the used element, FIG. 1*b* shows an element included in a circuit, FIG. 2 shows a coordinate switch according to the invention in cross-section, FIG. 3 shows the coordinate switch in plan view with certain layers removed and FIG. 4 show a selector according to the invention provided with switching control means in a telecommunication system.

FIG. 1 shows the current through a connection element, hereinafter denominated a memory element, on which the selector design is based. The memory element has two different conditions, a high resistance one and a low resistance one. When a voltage is applied to the element, only a small leakage current flows through the same in correspondence to the portion O—$Ut$ of the diagram. When the ignition voltage $Ut$ has been reached, the current takes a higher value corresponding to the point A of the diagram, which is explained by the fact that the semi-conducting layer of the memory element, initially amorphous with high ohmic resistance. is transformed to the liquid state. The position of the point A (FIG. 1*a*) is defined by the battery voltage $Ub$ and the load resistance $Ra$ (see FIG. 1*b*). If the current is interrupted, the threshold element returns to its high-resistance condition through the points B and C, and the semi-conducting layer again becomes amorphous. If, on the contrary, the current decreases slowly from A toward O, the layer is transformed to a crystalline and rigid structure that has a substantially stable resistance and thus is independent of the current and current direction. As indicated in FIG. 1, the crystallization process is terminated at point B, i.e. when all parts of the current channel formed by the current corresponding to point A have been transformed to a rigid crystalline condition. From the point B onward the element behaves as a low ohmic resistance and the voltage-current diagram gives a straight line, through the origin, BB′. As is indicated, the same result will be obtained by a negative threshold voltage $-Ut$. If now by means of a current pulse the element is forced back to the part of the diagram corresponding to liquid state, to the point A or A′, and the current is interrupted, the element returns along path ACO or A′C′O′ respectively to the amorphous state, i.e. to a high-resistance condition.

The transition through point B or B′ is not so abrupt as shown in the figure. The position for point B is furthermore dependent upon to what extent the element has been transformed to the liquid condition, i.e. where the point A is located. This may be explained by the fact that at higher current values the cross sectional area of the current conducting channel is bigger and at the crystallization of this region a rigid conductor is formed with a lower ohmic resistance. Consequently the point B will be located at a higher current value, so that the portion BB′ of the diagram will be steeper.

FIG. 2 shows the selector according to the invention in cross section and FIG. 3 in plan view with certain parts removed. Each of a group of incoming conductors is indicated by $x1$, $x2$ and so on and of a group of outgoing conductors is indicated by $y1$, $y2$ and so on. The conductors $x$ are provided with a coating 1 of active layer material and conductive connections 2 are arranged between the layer material of these conductors and the conductors of the $y$-group in such a way that the layer material of each conductor in the $x$-group is connected to each conductor in the $y$-group. The two groups of conductors are insulated from each other by means of insulating plates 3 and 5. Between these plates there is provided a metal shield 4 with the object to prevent capacitive coupling between the conductors of the first and second groups of conductors. The insulating plates and the metal shield are provided with perforations 6, the diameter of which is bigger than the diameter of the conductive connections 2 in order to avoid conductive contact with the shield 4. The whole layer structure is conveniently arranged on an insulating mounting plate 7.

FIG. 4 shows a connection diagram for a selector according to the invention with its wiring to other devices of a telecommunication system, which devices control the selector. The selector V that is designed for two-wire connections, is adapted for connecting $n$ inlets (line inlets) LE1–LEN and $m$ outlets (link outlets) LK1–LKM, whereby $n$ generally is larger than $m$. The line conductor pair connections are indicated by $y1$, $y2$ etc., the link conductor pair connections being indicated by $x1$, $x2$ etc. and the memory elements connecting the respective wire pairs with each other by M11*a*, M11*b*, M12*a*, M12*b* etc. To each one of the conductor pairs corresponds a gate $Gx$ and to each one of the conductor pairs $y$ a gate $Gy$. The object of the gates is to connect an ignition voltage to the memory elements provided in the respective crossing points. The gates are controlled by means of logic circuits STX and STY, which in turn are controlled by a marker MA that establishes the connection and the disconnection of the communication. As explained above, the memory elements have to be supplied with a voltage higher than the threshold voltage. This is achieved by the two gates, corresponding to a selected crossing point, each of which feeds slightly more than half the threshold voltage $Ut/2$ to the two conductors crossing one another at the point. Furthermore, it is necessary to slowly reduce the voltage, if it is desired to maintain the element in its low-resistance condition. This is carried out by means of a voltage source A that generates a saw-tooth-formed current and that is controlled by means of a marker through a $Ga$ in such a way, that after the respective crossing point has been brought to conductive condition, the slowly decreasing current is applied in order to maintain the memory element in its low-resistance condition. In order to effect an interruption by bringing the memory element to its high-resistance condition, a source B giving a steeply decreasing current, is connected through a gate G*b* by means of a marker, when the connection is to be disconnected.

Supporting that, for example, the line conductor pair *y*1 should be connected to the link conductor pair *x*2, the elements located in the crossing points between the conductor pairs *y*1, *x*2 are made conducting. By means of a logic circuit of the link gates STX, the gate G*x*2 is opened and by the logic circuit of the line gates STY the gate G*y*1 is opened. Through the gate G*x*2 a positive voltage is connected, which voltage is somewhat greater than half the ignition voltage and through the gate G*y*1 a negative voltage is connected, the absolute value of which also is somewhat greater than half the ignition voltage, so that the element is ignited. In accordance with what has been discussed above, a strong current will flow from the the pulse generator A through the link gate G*x*2, the wires of conductor pair *x*2, memory elements M21*a* and M21*b* to the wires of conductor pair *y*1 and therefrom through a diode D1 to ground. The line gate G*y*1 can now stop functioning because the current passes through the diode D1. The current decreases slowly to zero, the memory elements are transformed to their low-resistance condition, and the connection between line 1 and link 2 is ready. Holding current is no longer required, contrary to what is the case of other known electronic space distributed contact nets, and now also the link gate G*x*2 may be blocked. When the communication is to be disconnected, it is sufficient, thanks to the diode D1, to interfere only at the link side, i.e. to open the link gate G*x*2 and feed a current pulse with a steep rear flank from the pulse generator B through the link gate G*x*2, the conductor pair *x*2, the memory elements M21*a* and M22*b*, the conductor pair *y*1 and the diode D1. Thereby the memory elements are transformed from their low-resistance condition to their high-resistance condition. On the line gate side no connection function is necessary.

I claim:

1. Coordinate switch comprising a first group of parallelly arranged conductors and a second group of parallelly arranged conductors located in a crosswise direction relative to said first group of conductors, a plurality of memory elements, each memory element connecting a conductor of the first group at a crossing point to a conductor of the second group respectively, said memory element comprising a body of semi-conducting material, which can be transformed from a non-conducting state to a conducting state by the application of a voltage exceeding a threshold value and reducing the current thus passing through the memory element in a slowly decreasing time sequence, and which may be transformed from a conducting condition to a non-conducting condition by passing through the element a voltage pulse with a steeply decreasing time sequence, a first generating means for generating a voltage pulse with a sloping rear flank, a second generating means for generating a voltage pulse with a steep rear flank and control means for connecting alternatively said first generating means or said second generating means to any conductor of the first group and any conductor of the second group so that an electric connection may be established or disconnected between said two conductors through the memory element at the crossing point of said conductors.

2. Coordinate switch according to claim 1, wherein said each of said memory elements comprises a layer of said semi-conducting material on a surface of a conductor of the one group, said each conductor constituting one of the terminals of the memory element, the other terminal consisting of a connection from said layer to a conductor of the other group.

3. Coordinate switch according to claim 1, comprising a metal shield between said first and said second group of conductors and insulated therefrom for preventing capacitive coupling between said groups of conductors.

4. A telecommunication system using a marker for the establishment of connections and comprising coordinate switches according to claim 1, provided with gate circuits and control means for operating said gate circuits to connect a voltage exceeding half the threshold voltage to each of two conductors to be interconnected, said marker being arranged to actuate said control means and said pulse generating means to feed to the conductors a slowly decreasing voltage pulse or a steeply decreasing current pulse to transform the elements to conducting or non-conducting condition respectively.

5. A coordinate switch comprising a first group of parallelly arranged conductors and a second group of parallelly arranged conductors located in a crosswise direction relative to said first group of conductors, a plurality of memory elements, each of said memory elements connecting a different conductor of the first group to a different one of the conductors of the second group, each of said memory elements comprising a bi-directional semi-conductor current-controlling device including a solid state semiconductor material and electrodes coupling the same to its associated conductors, said solid state semiconductor material in one state having at least portions thereof between the electrodes in one structural state which is of high resistance and substantially an insulator for blocking the flow of current therethrough in either direction when an applied voltage is below an upper threshold voltage level, and in another state having at least portions thereof between the electrodes in another structural state which is of low resistance and substantially a conductor for conducting the flow of current therethrough in either direction when an applied voltage is raised above an upper threshold voltage level and then is slowly reduced to zero level, said portions of said solid state semiconductor material being controlled and substantially instantaneously changed from said blocking structural state to said conducting structural state by the imposition of a D.C. pulse of any polarity above said upper threshold voltage level and reverted to said blocking structural state by an instantaneous reduction of an imposed pulse to zero amplitude, a first generating means for generating a current pulse with a gradually sloping rear flank and control means for connecting said first generating means to any one conductor of the first group and any one conductor of the second group to change the memory element located in the corresponding crossing point from the non-conducting state to the conducting state to establish connection between said one conductor of the first group and said one conductor of the second group, respectively, a second generating means for generating a current pulse with a steep rear flank, and further control means for connecting said second generating means to said one conductor of the first group and said one conductor of the second group to change said memory element to the non-conducting state to interrupt the connection between said conductors.

References Cited

UNITED STATES PATENTS

| | | | |
|---|---|---|---|
| 3,141,067 | 7/1964 | Spandorfer | 179—18.7 |
| 3,185,898 | 5/1965 | Ehlschlager | 179—18.7 |
| 3,188,487 | 6/1965 | Hutson | 307—88.5 |
| 2,271,591 | 9/1966 | Ovshinsky | 307—88.5 |

KATHLEEN H. CLAFFY, *Primary Examiner.*

L. WRIGHT, *Assistant Examiner.*